United States Patent
Suanno et al.

(10) Patent No.: US 12,172,716 B2
(45) Date of Patent: Dec. 24, 2024

(54) TRACK ROLLER HAVING COLLAR FORMING OIL VOID FOR IMPROVED SEAL LUBRICATION

(71) Applicant: Caterpillar Inc., Peoria, IL (US)

(72) Inventors: Gennaro Suanno, Modena (IT); David Jennings Hakes, Princeville, IL (US); Lewis Clinton Hunt, Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 671 days.

(21) Appl. No.: 17/372,077

(22) Filed: Jul. 9, 2021

(65) Prior Publication Data
US 2023/0010629 A1   Jan. 12, 2023

(51) Int. Cl.
 *B62D 55/092* (2006.01)
 *B62D 55/088* (2006.01)
 *B62D 55/14* (2006.01)

(52) U.S. Cl.
 CPC ......... *B62D 55/092* (2013.01); *B62D 55/088* (2013.01); *B62D 55/14* (2013.01)

(58) Field of Classification Search
 CPC .... B62D 55/088; B62D 55/092; B62D 55/14; B62D 55/15; F16J 15/34; F16J 15/344; F16J 15/3464
 USPC ............................................ 305/100; 301/10
 See application file for complete search history.

(56) References Cited

U.S. PATENT DOCUMENTS

| | | | |
|---|---|---|---|
| 3,515,446 A * | 6/1970 | Maguire | B62D 55/092 384/418 |
| 6,364,438 B1 | 4/2002 | Hasselbusch et al. | |
| 8,979,219 B2 | 3/2015 | Hisamatsu | |
| 10,023,251 B2 * | 7/2018 | Recker | B62D 55/088 |
| 10,612,667 B2 * | 4/2020 | Ventura | F16J 15/3464 |
| 11,235,822 B2 * | 2/2022 | Nagaoka | B62D 55/14 |
| 2010/0038861 A1 * | 2/2010 | Huang | F16J 15/3484 277/372 |
| 2017/0369111 A1 | 12/2017 | Recker | |
| 2019/0077474 A1 * | 3/2019 | Nagaoka | B62D 55/14 |
| 2020/0116261 A1 * | 4/2020 | Haas | F16J 15/3404 |
| 2020/0180714 A1 | 6/2020 | Umbach et al. | |
| 2021/0291918 A1 * | 9/2021 | Suanno | B62D 55/08 |

FOREIGN PATENT DOCUMENTS

| | | |
|---|---|---|
| DE | 4208112 A1 | 9/1992 |
| JP | 08230731 A | 9/1996 |
| JP | 2015147436 A | 8/2015 |
| WO | 2015008598 | 1/2015 |
| WO | 2015008598 A1 | 1/2015 |
| WO | 2017053643 | 3/2017 |

* cited by examiner

*Primary Examiner* — Kip T Kotter
*Assistant Examiner* — Eva L Comino

(57) ABSTRACT

A track roller includes a roller shell, a roller shaft extending through the roller shell, and a collar. The collar includes a center body interference-fitted upon the roller shaft, and a seal carrier. A clearance extends radially between a center body outer surface and a face seal assembly held in axial compression between the seal carrier and the roller shell. An oil void is formed in the center body and fluidly connected to the clearance to provide an increased oil volume for lubrication and heat-dissipation.

20 Claims, 3 Drawing Sheets

TRACK ROLLER HAVING COLLAR FORMING OIL VOID FOR IMPROVED SEAL LUBRICATION

TECHNICAL FIELD

The present disclosure relates generally to a track roller, and more particularly to a collar for a track roller having an oil void arranged to contain oil for improved seal lubrication.

BACKGROUND

Track-type machines are used throughout the world in a variety of off-highway environments, including for applications such as mining, construction, forestry, road building, at landfills, and many others. A typical track-type machine includes a ground-engaging track positioned at each side of a machine frame. The ground-engaging track extends about a plurality of rotatable track-contacting elements including one or more idlers, a drive sprocket, and track rollers. The ground-engaging tracks can be advanced in a first direction to move the track-type machine forward, in a reverse direction to move the track-type machine back, and at differing speeds to change a travel direction or orientation of the track-type machine.

Track-type machines tend to be quite heavy both as a necessity for certain working applications and also because the large and complex parts of the machinery are generally built to be quite robust and heavy duty. The operating conditions experienced by track-type machines can also be quite rugged, pushing heavy loads, traveling over steep terrain, and interacting with coarse and abrasive substrate materials. The track rollers typically carry much of the weight of the track-type machine and rotate continuously as the track-type machine travels. For this reason, track rollers are typically constructed to withstand a range of types of loading that can be severe in magnitude, repetitive, and variable depending upon how the track-type machine is used. Engineers have developed a variety of lubrication strategies for track rollers in an effort to optimize field performance and service life.

In one common track roller design, metal face seals are used to provide a rotating but fluidly sealed interface between track rollers and a supporting roller shaft. Face seals and associated assemblies have been used for many years with great success. In certain applications, however, existing sealing strategies can experience relatively high speeds of the rotating face seal components relative to one another, eventually resulting in performance degradation or failure. Efforts to accommodate various sealing strategies can also complicate the engineering and design of other parts of a track roller. One known track roller assembly configuration is set forth in U.S. Pat. No. 6,364,438 to Hasselbusch et al. In Hasselbusch et al., a roller assembly has a roller rim and a roller shaft. A retainer is press-fit into an access opening in the roller rim. An axial thrust bearing is interposed an outwardly extending flange of the roller shaft and a retainer. While Hasselbusch et al. undoubtedly has various applications, there is always room for improvement and development of alternative strategies.

SUMMARY

In one aspect, a track roller includes a roller shell having an outer tread surface, and a shell inner surface forming a shell bore defining a bore center axis. The track roller further includes a collar having a center body having a center body first axial end, a center body second axial end, a center body inner surface forming a collar bore, a center body outer surface, and a seal carrier connected to the center body second axial end and projecting radially outward of the center body. The track roller further includes a roller shaft extending through the shell bore and the collar bore, and a face seal assembly held in axial compression between the seal carrier and the roller shell. A clearance extends radially between the center body outer surface and the face seal assembly and circumferentially around the bore center axis. An oil void is formed in the center body and arranged axially between the center body first axial end and the center body second axial end and is fluidly connected to the clearance, and the oil void extending radially inward from the center body outer surface and circumferentially around the bore center axis.

In another aspect, a collar for a roller shaft in a track roller includes a center body having a center body inner surface forming a collar bore defining a collar center axis, a center body outer surface, a center body first axial end having a center body axial end face extending circumferentially around the collar bore, and a center body second axial end. A seal carrier is connected to the center body second axial end and includes a flange section extending in an axial direction of the center body first axial end, the flange section including a seal carrier end face, and a seal surface facing the center body outer surface and forming a taper enlarged in an axial direction of the center body first axial end. The center body projects from the seal carrier such that the center body axial end face is spaced axially outward of the seal carrier end face, and the center body outer surface further includes a first section adjacent to the seal carrier, an end section adjacent to the center body axial end face, and an oil void formed axially between the first section and the end section and extending radially inward into the center body.

In still another aspect, a collar for a roller shaft in a track roller includes a center body forming a collar bore defining a collar center axis, and a seal carrier connected to the center body and including a flange section having a flange section outer surface, an inner seal surface extending circumferentially around the center body, and a seal retention lip adjacent to the inner seal surface. The flange section further includes a seal carrier axial end face, and the center body projects axially outward of the seal carrier and includes a center body axial end face spaced axially outward of the seal carrier axial end face. The center body further includes an oil groove formed therein and extending circumferentially around the bore center axis. The oil groove defines a groove depth and a groove width greater than the groove depth, and extends circumferentially around the bore center axis to form an oil volume fluidly connected to a clearance between the center body and a seal assembly when supported in the seal carrier.

DETAILED DESCRIPTION

Figure 1:
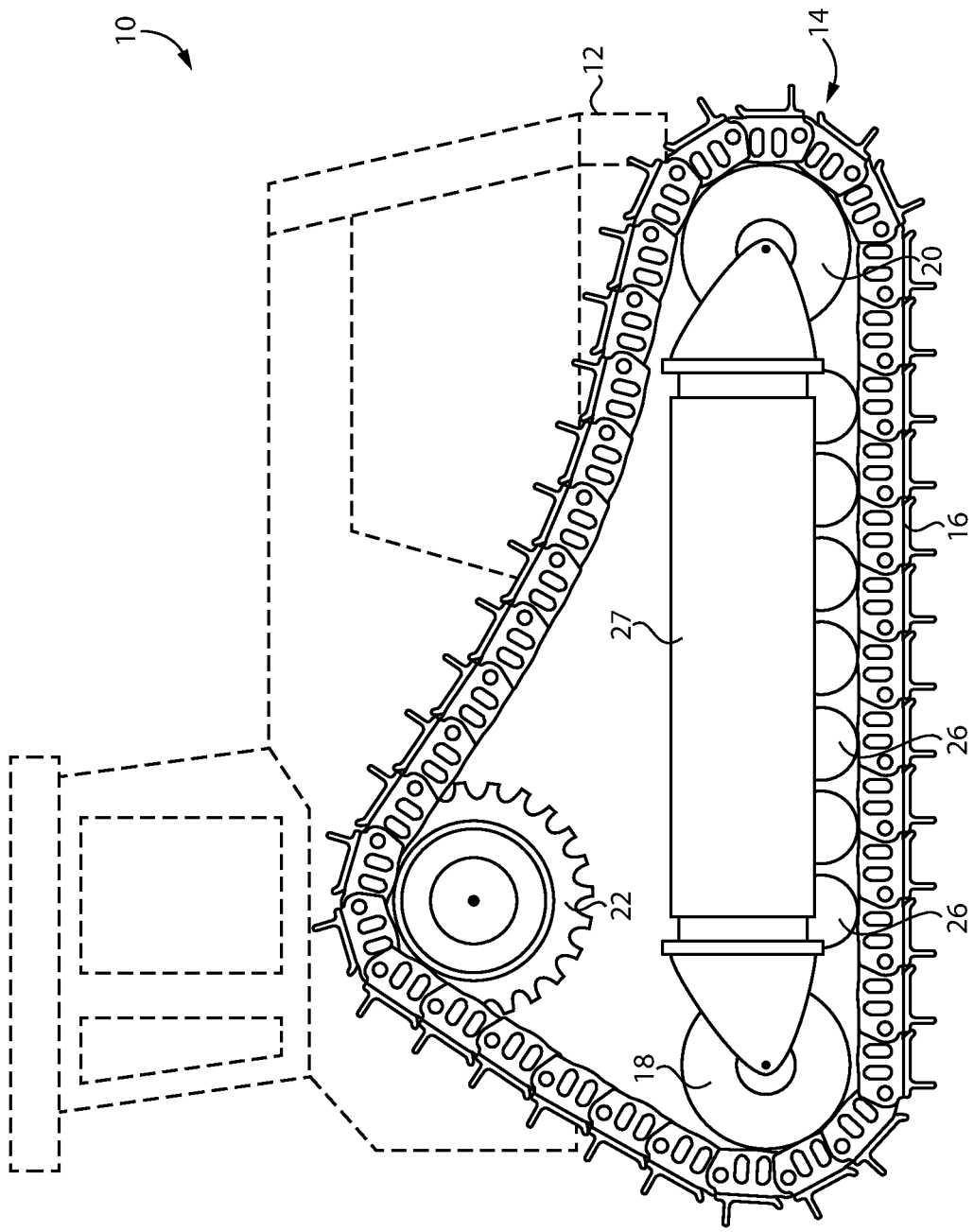
FIG. 1 is a side diagrammatic view of a machine, according to one embodiment.

Referring to FIG. 1, there is shown a track-type machine 10, according to one embodiment. Machine 10 includes a machine frame 12 and a ground-engaging track system 14 supporting machine frame 12. Track system 14 includes a front idler 18, a back idler 20, a drive sprocket 22, a plurality of track rollers 26, and a track roller frame 27. Track 16 includes a plurality of coupled together track links with attached track shoes forming an endless loop extending about the various rotatable elements. Track 14 is shown in a so-called "high drive" configuration, but in other embodiments an oval track or still another track arrangement could be used. A substantially identical track and rotatable elements may be positioned upon a side of machine frame 12 opposite to that shown in FIG. 1. A practical implementation of the present disclosure relates to track rollers mounted to a track roller frame and supporting much of the weight of a machine purpose-built for use in an off-highway machinery environment. In other applications, track "rollers" serving other purposes, or used in a different environment such as in a track conveyer application, for example, may fall within the scope of the present disclosure. In the illustrated embodiment, machine 10 is a track-type tractor. In other embodiments a machine according to the present disclosure could include a track-type loader, a mining machine, an excavator, a half track machine, or still another.

Figure 2:
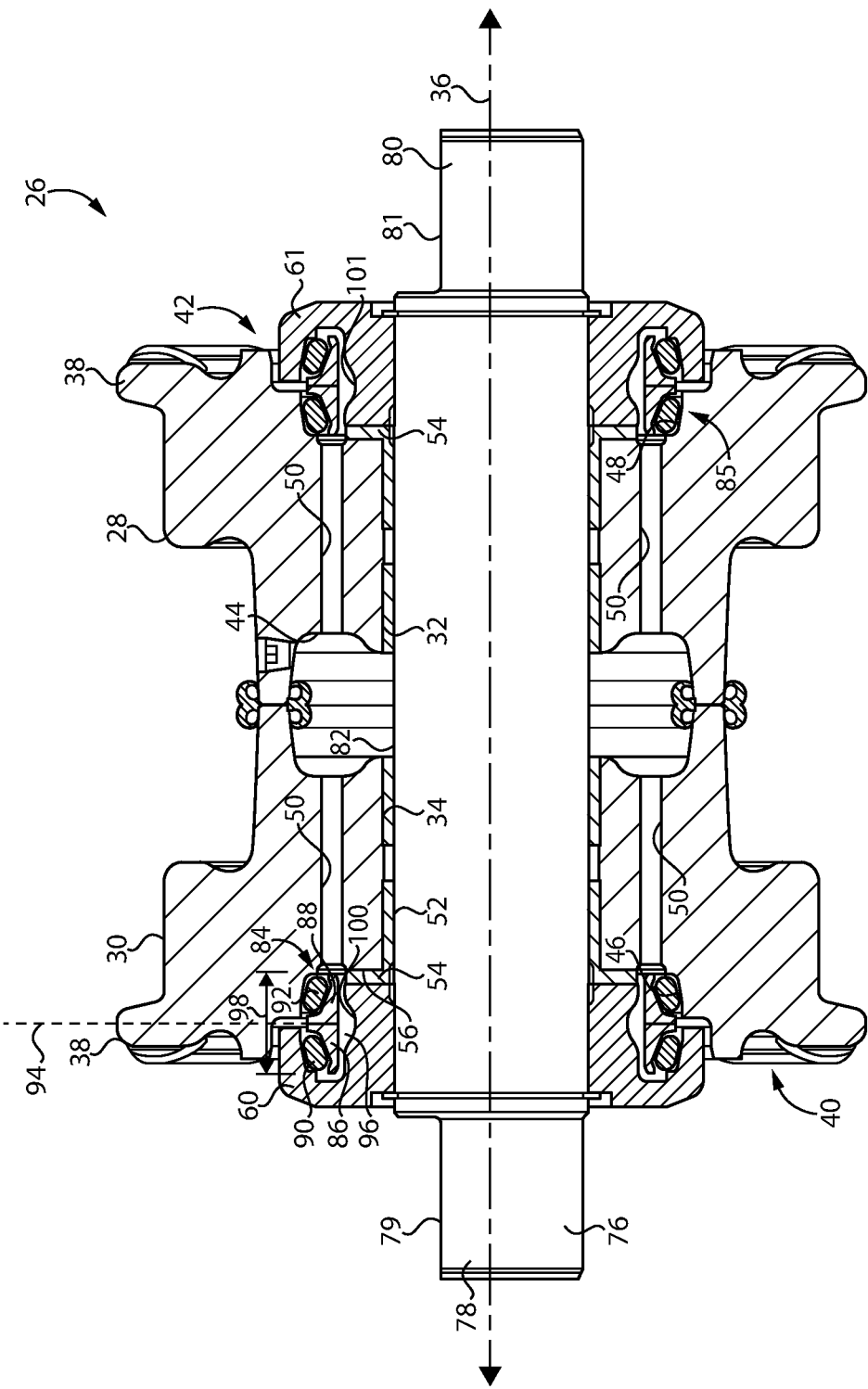
FIG. 2 is a partially sectioned diagrammatic view of a track roller, according to one embodiment.

Referring also now to FIG. 2, there is shown one of track rollers 26, hereinafter referred to in the singular. Track roller 26 includes a roller shell 28 having an outer tread surface 30 structured to rotate in contact with two parallel chains of track links in track 16. Roller shell 28 also includes a shell inner surface 32 forming a shell bore 34 defining a bore center axis 36. Roller shell 28 may be made from two welded half shells attached such as by friction welding, however, the present disclosure is not thereby limited. Roller shell 28 may also include end flanges 38 that assist in guiding contact between track roller 26 and track 16 during service. Roller shell 28 further includes a first roller shell axial end 40, and a second roller shell axial end 42. A first seal recess 46 is formed in first roller shell axial end 40, and a second seal recess 48 is formed in second roller shell axial end 42. A plurality of oil passages 50 may extend between an oil cavity 44 and first seal recess 46 and between oil cavity 44 and second seal recess 48. Each of first seal recess 46 and second seal recess 48 may have a stepped-in profile from the perspective first and second roller shell axial ends 40 and 42 as depicted. Sleeve bearings 52 are also positioned within shell bore 34 to rotatably support roller shell 28 upon a roller shaft 76 extending through shell bore 34. Thrust bearings 44, configured as annular pieces separate from sleeve bearings 52 in the illustrated embodiment, are positioned adjacent to a first thrust face 56 and a second thrust face 58 of roller shell 28.

Figure 3:
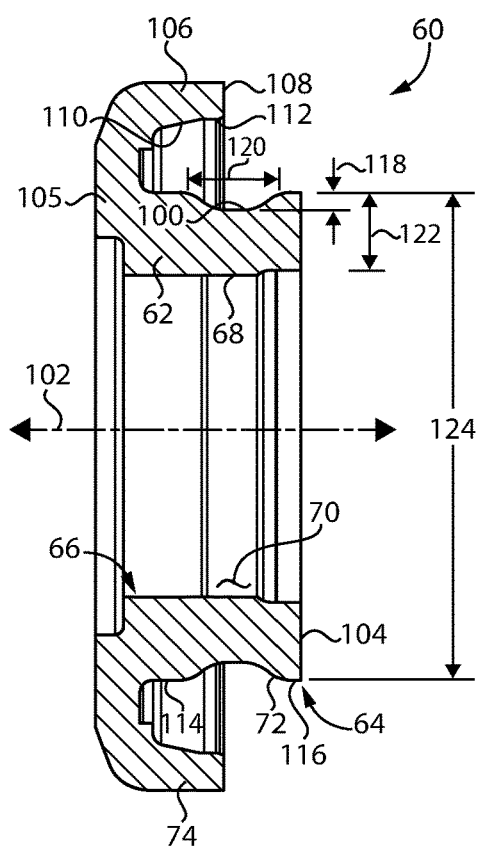
FIG. 3 is a sectioned view of a collar for a track roller, according to one embodiment.
Figure 4:
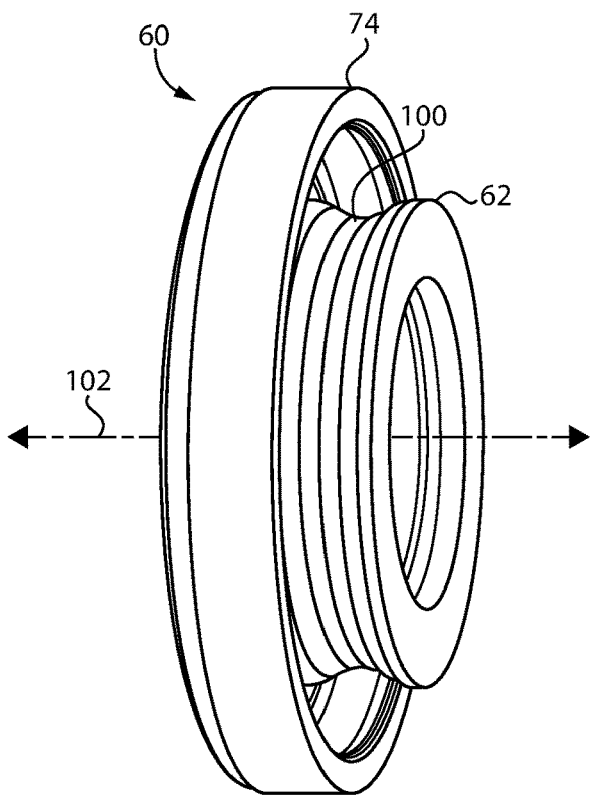
FIG. 4 is a diagrammatic view of a collar as in FIG. 3.

Track roller 26 further includes a first collar 60 and a second collar 61. First collar 60 and second collar 61 may be interference-fitted upon roller shaft 76 and each positioned to contact one of thrust bearings 54 to react thrust loads experienced by roller shell 28 during service. Referring also now to FIGS. 3 and 4, collar 60, and by way of analogy collar 61, which may be identical, includes a center body 62 having a first center body axial end 64, a second center body axial end 66, and a center body inner surface 68 forming a collar bore 70 defining a collar center axis 102. Bore center axis 36 and collar center axis 102 may be coaxially arranged. Collar 60 further includes a center body outer surface 72, and a seal carrier 74 connected to second center body axial end 66 and projecting radially outward of center body 62. Center body first axial end 64 includes a center body axial end face 104 extending circumferentially around collar bore 70. Seal carrier 74 includes a base section 105, and a flange section 106 extending in an axial direction of center body first axial end 64. Flange section 106 includes a seal carrier axial end face 108, with center body 62 projecting from seal carrier 74 such that center body axial end face 104 is spaced axially outward of seal carrier axial end face 108. Center body outer surface 72 includes a first section 114 adjacent to seal carrier 74, and an end section 116 adjacent to center body axial end face 104. Each of the first section 114 and second section 116 may be cylindrical.

As noted above, roller shaft 76 extends through shell bore 34. Roller shaft 76 also extends through collar bore 70 in collar 60. It should be appreciated that description and discussion herein of collar 60 should be understood to refer by way of analogy to collar 61, as collars 60 and 61 may be identical. In some embodiments only collar 60 might be used in connection with a first end of a roller shaft, and a different support and thrust loading mechanism used in connection with an opposite end of a roller shaft. Roller shaft 76 includes in the illustrated embodiment a first shaft end 78 outboard of collar 60, and a second shaft end 80 outboard of collar 61. As used herein the term "outboard" means toward or beyond an outside of something, in the present case beyond an outside of collar 60 when installed in track roller 26 with "inboard" having an opposite definition. The term "axially outward" means a direction along an axis toward or beyond an outside or exterior of something, with "axially inward" having an opposite definition. A first flat surface 79 is formed on first shaft end 78 and a second flat surface 81 is formed on second shaft end 80. Flats 79 and 81 can be used to mount roller shaft 76 and constrain roller shaft 76 against rotation during service, such as by way of engagement with complementarily shaped track roller mounting blocks, clamps, or other mounting hardware. It will thus be appreciated that in the illustrated embodiment roller shaft 76 and collars 60 and 61 will typically be fixed against rotation relative to track roller frame 27 by interference fits with roller shaft 26, with roller shell 28 free to rotate during service.

Track roller 26 further includes a face seal assembly 84 held in axial compression between seal carrier 74 of collar 60 and roller shell 28, and positioned in first seal recess 46. Another, typically substantially identical, face seal assembly 85 is held in axial compression between a seal carrier of collar 61 and roller shell 28, and positioned within second seal recess 48. Description herein of face seal assembly 84 will thus be understood by way of analogy to also refer to face seal assembly 85. Face seal assembly 84 may include a first annular and metallic seal ring 86 and a second annular and metallic seal ring 88. Face seal assembly 84 may also include a first annular and non-metallic sealing element 90 and a second annular and non-metallic sealing element 92. Seal ring 86 may be fixed against rotation with collar 60 relative to roller shell 28. Seal ring 88 may rotate with roller shell 28. Seal ring 86 and seal ring 88 abut one another at a seal contact plane 94.

With continued focus on FIGS. 3 and 4, seal carrier 74 further includes a seal surface 110 facing center body outer surface 72. Seal surface 110 may be contacted by sealing element 90, and forms a taper enlarged in an axial direction of center body first axial end 64. In an embodiment, seal surface 110 may be a conical surface. A seal retention lip 112 is adjacent to inner seal surface 110 and can assist in retaining sealing element 90 in place during assembly, installation, and service. It will be recalled that each of collar 60 and collar 61 can be interference-fitted upon roller shaft 76. Snap rings (not numbered) may be positioned within snap ring grooves in roller shaft 76 axially outward of each of collar 60 and collar 61, supporting the interference-fits and maintaining collars 60 and 61 against displacement during reacting of thrust loads in service.

As can also be seen in FIG. 2, a clearance 96 extends radially between center body outer surface 72 and face seal assembly 84 and circumferentially around bore center axis 36. An oil void 100 is formed in center body 62 and arranged axially between first center body axial end 64 and second center body axial end 66. Oil void 100 may further be understood as formed axially between first section 114 of center body outer surface 72 and end section 116 of center body outer surface 72. Oil void 100 extends radially inward from center body outer surface 72 into center body 62 and extends circumferentially around bore center axis 36. Seal carrier axial end face 108 may define a plane intersecting oil void 100.

In an embodiment, oil void 100 includes an oil groove extending fully circumferentially around collar center axis 102 and fully circumferentially around bore center axis 36. Seal ring 86 and seal ring 88 define seal contact plane 94 as noted above. Seal contact plane 94 is oriented normal to bore center axis 36 and intersects oil void 100 in the illustrated embodiment. It can also be seen from the drawings that an axial extent of oil void 100 is less than a combined axial extent 98 of seal ring 86 and seal ring 88. Oil void 100 may be axially symmetric about seal contact plane 94.

Oil void 100, including where configured as an oil groove, defines a groove depth dimension 118 radially inward into center body 62, and a groove width dimension 120 that is greater than groove depth dimension 118. Groove width dimension 120 can be understood as the axial extent of oil void 100 referenced above. It will also be noted a second oil void 101 is formed in a center body outer surface of collar 61, and description and discussion herein of oil void 100 are to be understood by way of analogy to refer also to oil void 101. Center body 62 is also understood to define a wall thickness dimension 122 between center body inner surface 68 and center body outer surface 72. Groove depth dimension 118 may be from 15% to 33% of wall thickness dimension 122. Center body 62 further defines an outer diameter dimension 124 at center body first axial end 64, and groove width dimension 120 may be from 3% to 5% of outer diameter dimension 124. Groove width dimension 120 may also be from 30% to 70% of axial extent 98. The disclosed proportional ranges can provide an optimal storage volume of oil within oil void 100 in view of lubrication and heat-dissipation considerations of face seal assemblies 84 and 85 as well as manufacturability and structural integrity, as further discussed herein.

Figure 5:
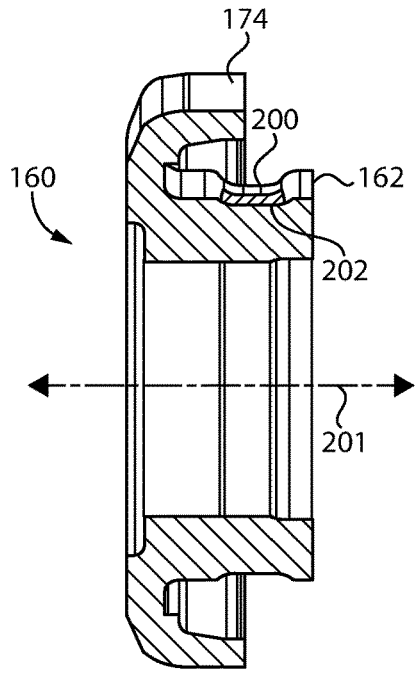
FIG. 5 is a sectioned view of a collar for a track roller, according to another embodiment.
Figure 6:
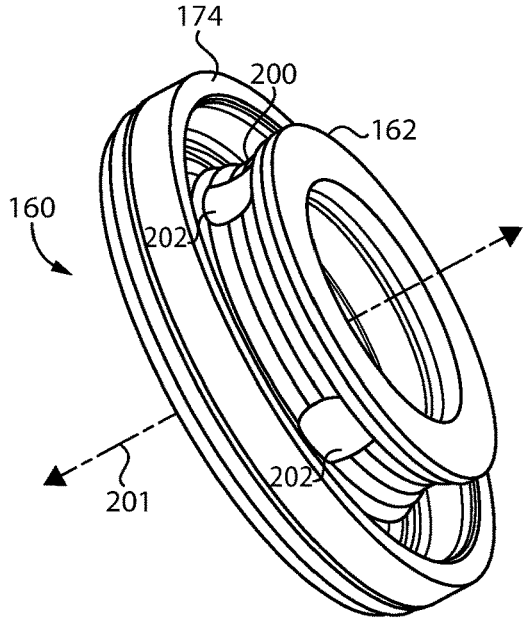
FIG. 6 is a diagrammatic view of a collar as in FIG. 5.

Turning focus now to FIGS. 5 and 6, there is shown a collar 160 according to another embodiment. Collar 160 may be similar or identical to collar 60 described above, except where otherwise indicated or apparent from the context. Collar 160 includes a center body 162 and a connected seal carrier 174. An oil void 200 having the form of an oil groove extends circumferentially around a collar center axis 201. Rather than a uniform circumferential oil groove, collar 160 includes one, two, or more oil-deflection protrusions 202 or humps interrupting oil groove 200. In the illustrated embodiment an oil deflection protrusion 202 as shown in FIG. 5 is one of a plurality of oil-deflection protrusions 202 interrupting oil groove 200 at locations spaced circumferentially around collar center axis 201, as shown in FIG. 6. FIG. 6 illustrates 2 oil-deflection protrusions 202, and a third oil-deflection protrusion 202 is hidden from view. Oil deflection protrusions 202 may be regularly spaced circumferentially around collar center axis 201, such as at 120° locations. Oil-deflection protrusions 202 can assist in mixing, distributing, and flowing lubricating oil within oil groove 200 and an adjacent clearance between collar 160 and a face seal assembly, enhancing lubrication and cooling in service. Oil-deflection protrusions 202 could interrupt oil groove 200 completely, such that oil groove 200 is effectively formed by multiple separate oil grooves, or oil-deflection protrusions 202 could be structured to as to only fill a part of a cross-sectional area of an oil groove.

INDUSTRIAL APPLICABILITY

Referring to the drawings generally, but returning focus to FIG. 2, it will be recalled roller shell 28 forms an oil cavity 44. Oil cavity 44 may extend circumferentially around roller shaft 76, with a shaft outer surface 82 exposed to oil cavity 44. Roller shaft 76 may be a so-called straight shaft uninterrupted in cylindrical profile within shell bore 34. This feature differs from certain earlier strategies where a shaft flange was formed approximately midway along a length of a roller shaft and employed to react thrust loads. According to the present disclosure thrust loads are reacted between collars 60 and 61 and thrust faces 56 and 58 of roller shell 28. To provide optimum and successful sealing where collars are used for reacting thrust loads, it is generally necessary to form face seal assemblies to be larger in diameter than the associated thrust faces. Put differently, face seal assemblies are desirably positioned radially outward of thrust bearings 54. Relatively larger face seal assemblies can be associated with relatively greater seal speeds of rotation during service.

The relatively faster rotation of interfacing seal surfaces in such applications can generate heat from friction, and be associated with increased wear and potentially seal failure or other problems if robust lubrication is not provided. Oil void 100, and oil void 101, provide additional oil volume within track roller 26 that can assist in protecting face seal assemblies 84 and 85 from performance degradation or failure. Another way to understand the disclosed strategy is that more oil can be stored in track roller 26 and available for lubrication than would otherwise be practicable. In an implementation, each of oil void 100 in first collar 60 and oil void 101 in second collar 61 defines an oil volume that is from 2% to 4% of a total oil volume sealed within track roller 26 fluidly between first face seal assembly 84 and second face seal assembly 85. Accordingly, the oil volumes of oil cavity 44, oil passages 50, clearance 96 and a counterpart clearance in association with collar 61, plus oil voids 100 and 101, together with various oil films in other spaces within track roller 26 can all be summed together to define a total carried oil volume, with oil voids 100 and 101 providing the stated range in proportional volume. In a refinement, each oil void 100 and 101 may define an oil volume that is approximately 3% of that total carried oil volume sealed within track roller 26.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure.

Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A track roller comprising:
a roller shell including an outer tread surface, and a shell inner surface forming a shell bore defining a bore center axis;
a collar including a center body having a center body first axial end, a center body second axial end, a center body inner surface forming a collar bore, a center body outer surface, and a seal carrier connected to the center body second axial end and projecting radially outward of the center body;
a roller shaft extending through the shell bore and the collar bore;
a face seal assembly held in axial compression between the seal carrier and the roller shell;
a clearance extending radially between the center body outer surface and the face seal assembly and circumferentially around the bore center axis;
an oil void formed in the center body and arranged axially between the center body first axial end and the center body second axial end and fluidly connected to the clearance, and the oil void extending radially inward from the center body outer surface and circumferentially around the bore center axis; and
the center body defining a center body wall thickness dimension between the center body inner surface and the center body outer surface, and the oil void defining a depth dimension radially inward into the center body that is less than the center body wall thickness dimension.

2. The track roller of claim 1 wherein the face seal assembly includes a first seal ring and a second seal ring defining a seal contact plane oriented normal to the bore center axis and intersecting the oil void.

3. The track roller of claim 2 wherein an axial extent of the oil void is less than a combined axial extent of the first seal ring and the second seal ring.

4. The track roller of claim 3 wherein the oil void is axially symmetric about the seal contact plane.

5. The track roller of claim 1 wherein the seal carrier includes a seal carrier axial end face, and the center body axially projects from the seal carrier and the first center body axial end includes a center body axial end face spaced axially outward of the seal carrier axial end face.

6. The track roller of claim 5 wherein:
the center body outer surface has a cylindrical first section upon the center body first axial end, and a cylindrical second section upon the center body second axial end; and
the oil void includes an oil groove extending circumferentially around the bore center axis and formed axially between the cylindrical first section and the cylindrical second section.

7. The track roller of claim 5 wherein the oil void includes an oil groove that is fully circumferential of the bore center axis.

8. The track roller of claim 7 wherein the depth dimension includes a groove depth dimension, and the oil groove defines a groove width dimension that is greater than the groove depth dimension.

9. The track roller of claim 8 wherein:
the center body defines a wall thickness dimension between the center body inner surface and the center body outer surface; and
the groove depth dimension is from 15% to 33% of the wall thickness dimension.

10. The track roller of claim 1 wherein:
the roller shaft includes a straight shaft uninterrupted in cylindrical profile within the shell bore;
the collar includes a first collar interference-fitted upon the roller shaft and the face seal assembly includes a first face seal assembly, and the track roller further comprises a second collar interference-fitted upon the roller shaft and including a collar body outer surface having an oil void formed therein, and a second face seal assembly held in compression between the second collar and the roller shell; and
each of the oil void in the first collar and the oil void in the second collar defines an oil volume that is from 2% to 4% of a total oil volume sealed within the track roller fluidly between the first face seal assembly and the second face seal assembly.

11. A collar for a roller shaft in a track roller comprising:
a center body including a center body inner surface forming a collar bore defining a collar center axis, a center body outer surface, a center body first axial end having a center body axial end face extending circumferentially around the collar bore, and a center body second axial end;
a seal carrier connected to the center body second axial end and including a flange section extending in an axial direction of the center body first axial end, the flange section including a seal carrier end face, and a seal surface facing the center body outer surface and forming a taper enlarged in the axial direction of the center body first axial end; and
the center body projects from the seal carrier such that the center body axial end face is spaced axially outward of the seal carrier end face, and the center body outer surface further including a first section adjacent to the seal carrier, an end section adjacent to the center body axial end face, and an oil void formed axially between the first section and the end section and extending radially inward into the center body to an oil void bottom surface facing radially outward and formed by the center body.

12. The collar of claim 11 wherein the oil void includes an oil groove extending circumferentially around the collar center axis.

13. The collar of claim 12 wherein the center body further includes an oil-deflection protrusion interrupting the oil groove.

14. The collar of claim 12 wherein the oil-deflection protrusion is one of a plurality of oil-deflection protrusions interrupting the oil groove at locations spaced circumferentially around the collar center axis.

15. The collar of claim 12 wherein the oil groove defines a groove depth dimension and a groove width dimension that is greater than the groove depth dimension.

16. The collar of claim 15 wherein:
the center body defines a wall thickness dimension between the center body inner surface and the center body outer surface; and the groove depth dimension is from 15% to 33% of the wall thickness dimension.

17. The collar of claim 15 wherein the center body defines an outer diameter dimension at the center body first axial end, and the width dimension is from 3% to 5% of the outer diameter dimension.

18. A collar for a roller shaft in a track roller comprising:
a center body forming a collar bore defining a collar center axis;
a seal carrier connected to the center body and including a flange section having a flange section outer surface, an inner seal surface extending circumferentially around the center body, and a seal retention lip adjacent to the inner seal surface;
the flange further including a seal carrier axial end face, and the center body projecting axially outward of the seal carrier and including a center body axial end face spaced axially outward of the seal carrier axial end face;
the center body further including an oil groove formed therein and extending circumferentially around the bore center axis; and
the oil groove defining a groove depth and a groove width greater than the groove depth, and extending circumferentially around the bore center axis to form an oil volume fluidly connected to a clearance between the center body and a seal assembly when supported in the seal carrier.

19. The collar of claim 18 wherein:
the center body defines a wall thickness dimension, and an outer diameter dimension;
the groove depth dimension is from 15% to 33% of the wall thickness dimension; and
the groove width dimension is from 3% to 5% of the outer diameter dimension.

20. The collar of claim 18 wherein the seal carrier axial end face defines a plane intersecting the oil groove.

* * * * *